I. DAMON.

Gridiron.

No. 1,960. Patented Jan'y 30, 1841.

UNITED STATES PATENT OFFICE.

ISAAC DAMON, OF NORTHAMPTON, MASSACHUSETTS.

MANNER OF CONSTRUCTING GRIDIRONS.

Specification of Letters Patent No. 1,960, dated January 30, 1841.

*To all whom it may concern:*

Be it known that I, ISAAC DAMON, of Northampton, in the county of Hampshire and Commonwealth of Massachusetts, architect, have invented a new and Improved Gridiron for Broiling Meats and other Substances; and I do hereby declare that the following is a full and exact description of my said invention and improvement, to wit:

The frame is of metal and may be made of any form of the common gridiron now in use or which may be required. Instead of the round, flat, or fluted bars now in use I place upon the frame a metallic plate crimped or plaited like a ruffle which plate is fastened upon the sides of the frame by rivets or screws as the same is represented on the plans and drawings hereunto annexed and numbered 1, 2, 3, 4 and which with the references thereon are, and are to be considered as a part of this my specification.

Figure 4:
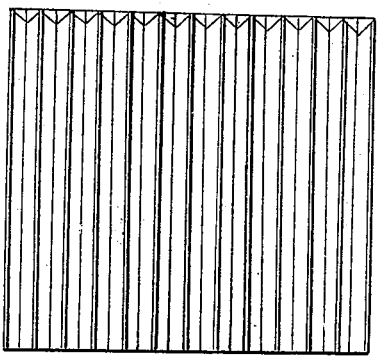
Figure 3:
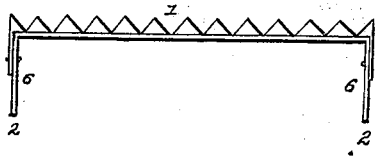
Figure 1:
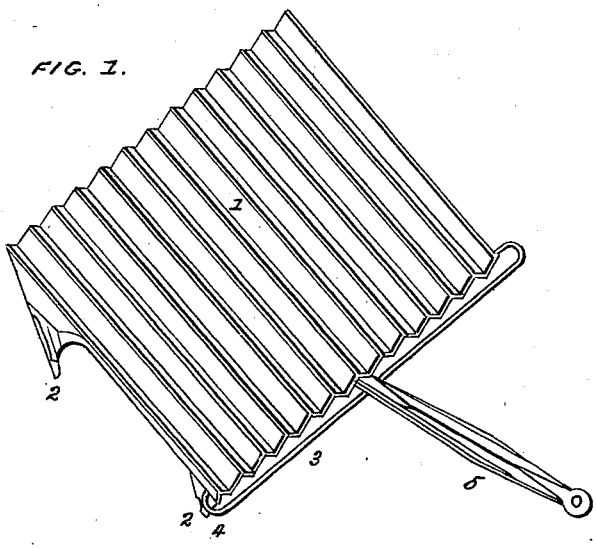
Figure 2:
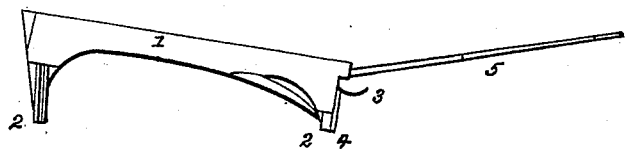

Between the gravy dish or dripping pan and the fire used for broiling I place a metallic plate as represented in plate Nos. 1 and 2 Figure 4 of sufficient size to protect the dish or pan fron such a degree of heat as would burn or injure the gravy contained in it.

Mode of operation: The article to be cooked is to be placed upon the crimped plate and then placed upon the fire, the gravy passes down the grooves in the crimped plate into the dripping pan and the fender between the fire and the pan preserves it from burning.

What I claim as my own invention and improvement upon the common gridiron and desire to secure by Letters Patent is—

The employment of the crimped metallic plate instead of bars and open spaces and also of the fender between the dripping pan and the fire as herein and in the plans and drawings hereunto annexed are specified and described by me.

Dated at Northampton aforesaid this twenty seventh day of October in the year of our Lord one thousand eight hundred and forty.

ISAAC DAMON.

Witnesses:
EBEN BARNARD,
SAML. WELLS.